(12) United States Patent
Williams et al.

(10) Patent No.: US 7,435,774 B2
(45) Date of Patent: Oct. 14, 2008

(54) FLUOROMONOMERS, FLUOROPOLYMERS, METHODS OF PREPARING THEM, AND THEIR APPLICATION TO VARIOUS SURFACES AND SUBSTRATES

(75) Inventors: Michael S. Williams, Rome, GA (US); Robert Jackson, Cartersville, GA (US); Robert Andrus, Rome, GA (US)

(73) Assignee: Peach State Labs, Inc., Rome, GA (US)

( * ) Notice: Subject to any disclaimer, the term of this patent is extended or adjusted under 35 U.S.C. 154(b) by 569 days.

(21) Appl. No.: 10/241,262

(22) Filed: Sep. 11, 2002

(65) Prior Publication Data

US 2004/0048974 A1    Mar. 11, 2004

(51) Int. Cl.
*C08K 5/02*    (2006.01)

(52) U.S. Cl. .................. 524/462; 524/544; 524/560; 524/792; 524/795; 526/242; 526/245

(58) Field of Classification Search ........... 524/544, 524/560, 462, 792, 795; 526/242, 245
See application file for complete search history.

(56) References Cited

U.S. PATENT DOCUMENTS

| | | | |
|---|---|---|---|
| 2,803,615 A | 8/1957 | Albrecht et al. | |
| 3,529,995 A * | 9/1970 | Sherman et al. | 442/80 |
| 3,698,856 A * | 10/1972 | Pittman et al. | 8/115.62 |
| 3,783,631 A | 1/1974 | Modahl et al. | |
| 4,029,585 A | 6/1977 | Dettre et al. | |
| 4,325,857 A | 4/1982 | Champaneria | |
| 4,388,372 A | 6/1983 | Champaneria | |
| 4,530,776 A | 7/1985 | Hisamoto et al. | |
| 4,600,441 A | 7/1986 | Goldberg et al. | |
| 4,647,706 A | 3/1987 | Chminal et al. | |
| 4,751,114 A * | 6/1988 | Homma et al. | 427/407.1 |
| 5,350,795 A | 9/1994 | Smith et al. | |
| 5,506,309 A | 4/1996 | Bierschenk et al. | |
| 5,523,346 A * | 6/1996 | Wu | 524/805 |
| 5,523,496 A | 6/1996 | Bierschenk et al. | |
| 5,539,059 A | 7/1996 | Bierschenk et al. | |
| 5,543,567 A | 8/1996 | Bierschenk et al. | |
| 5,557,012 A | 9/1996 | Bierschenk et al. | |
| 5,571,870 A | 11/1996 | Bierschenk et al. | |
| 5,608,002 A * | 3/1997 | Kubo et al. | 524/795 |
| 5,608,116 A | 3/1997 | Halling et al. | |
| 5,629,458 A | 5/1997 | Thenappan et al. | |
| 5,672,651 A | 9/1997 | Smith | |
| 5,674,949 A | 10/1997 | Bierschenk et al. | |
| 5,753,776 A | 5/1998 | Bierschenk et al. | |
| 6,156,389 A * | 12/2000 | Brown et al. | 427/393.4 |
| 6,197,426 B1 * | 3/2001 | Coppens | 428/421 |
| 6,359,006 B2 | 3/2002 | Pavia et al. | |
| 6,447,919 B1 * | 9/2002 | Brown et al. | 428/422 |
| 2002/0019442 A1 | 2/2002 | Pavia et al. | |
| 2002/0173585 A1 * | 11/2002 | Funaki et al. | 524/544 |
| 2004/0028914 A1 * | 2/2004 | Yanome | 428/447 |

FOREIGN PATENT DOCUMENTS

| | | |
|---|---|---|
| EP | 0124236 | 11/1984 |
| JP | 10109954 | 4/1998 |
| WO | WO 99 16809 A | 4/1991 |
| WO | WO 9916809 A1 * | 4/1999 |

OTHER PUBLICATIONS

"3M Objects to Proposed Rule of Perfluoroalkyl Sulfonates," *Chemical Market Reporter*, Section 2, Aug. 19-26, 2002.
"Sep. 5, 2002 Patent Viability Sudy (Comparison of Exfluor's Rf-Acrylate, Methacrylate homo(co)polymers to Clarlan't Fluowet AC 812, MA 812 homo(co)polymers)," p. 1-3.
"Technical Information," *DuPont™ Vertrel® XF Specialty Fluid*, Dec. 2001, p. 1-3.
"MS: Your Direct Source for DuPont Vertre: "Vertrel" XF," http://www.microcare.com/vertrelsolvents/MSDS/MSDS_VertrelXF.html, Sep. 26, 2000, p. 1-7.
"MS: Your Direct Source for DuPont Vertre: "Vertrel" CCA," http://www.microcare.com/vertrelsolvents/MSDS/MSDS_VertrelCCA_VDG.html, Feb. 18, 2002, p. 1-4.

* cited by examiner

*Primary Examiner*—Bernard Lipman
(74) *Attorney, Agent, or Firm*—Kilpatrick Stockton LLP

(57) ABSTRACT

This invention relates to compositions, and methods for producing compositions, for increasing oil repellency, water repellency, or both, of fabric or fibers, containing:
(a) an effective amount of a repellent polymer selected from the group consisting of homopolymers and copolymers of one or more monomers having formula I:

$$R_f—(CH_2)_n—P \qquad (I)$$

wherein P is a polymerizable or copolymerizable moiety; and
(b) a fluorinated carbon solvent.

18 Claims, No Drawings

FLUOROMONOMERS, FLUOROPOLYMERS, METHODS OF PREPARING THEM, AND THEIR APPLICATION TO VARIOUS SURFACES AND SUBSTRATES

BACKGROUND OF THE INVENTION

1. Field of the Invention

This invention relates to fluoropolymer compositions that do not contain substantial quantities of problematic perfluorooctanylsulfonate compounds, that have desirable environmental properties, such as noncombustibility, decreased volatility, do not deplete ozone, and that are suitable as oil and/or water repellency treatments for fiber, fabrics, and carpets. The invention also relates to methods for producing such compounds that result in compositions that do not require removal of the polymerization solvent prior to application or use of the compositions.

2. Description of Related Art

Fluorine containing compounds have been in development and use for 50 years. Fluorine is used to create pharmaceutical drugs used to treat diseases in humans and animals. Fluorine is also used to create polymers that excellent barrier properties, suitable for use in medical devices, such as the heart lung machine, the kidney dialysis machine, and the fluid bags that store and deliver life-giving fluids during medical treatments and surgical operations. Fluorinated polymers are used to produce bandages for open skin wounds and burns, filters for air purification, military clothing, outdoor apparel, resins for use in paints and gel-coatings used on boats, and food packaging. The carbon-fluorine bond is one of the strongest single bonds known to the chemist, and as a result, fluorinated carbon polymers are particularly suitable for use in situations where thermal stability to very high temperatures is required of polymeric materials. Polymer products such as Dupont Teflon are known for their ability to withstand the heating and thermal fluctuation conditions that are encountered in outer space. Teflon is well known for its performance in cookware, in seals and gaskets, and as a wire coating.

In recent times, the use of sulfur-containing fluoropolymers having a perfluorocarbon chain length of eight carbons (typically known as perfluorooctylsulfonates, or PFOS) have been criticized for their bioaccumulative effects. These compounds and compositions containing them have been and will likely continue to be, the subject of intense regulatory scrutiny, and generally negative recommendations relating to their continued manufacture and use. Similarly, the decomposition effects of C-8 perfluorocarbon compounds having alcohol (OH) reactive groups that are esterified rather than sulfonated are being carefully evaluated by regulatory and industry groups, because these compounds have the potential to decompose into the corresponding C-8 perfluoro-alcohol under certain conditions. As with PFOS, the bioaccumulative effects of these alcohols is of concern to regulatory agencies.

Both sulfonated perfluoro compounds and perfluoro alcohols having 8 perfluorocarbon atoms appear to have reactive groups that can decompose to substances that accumulate in biological filter systems, such as stream beds or filtering organs of mammals.

Telomerization is a radical displacement or chain transfer reaction that results in the production of large numbers of small sized monomer molecules. However, telomerization results in a distribution of materials of different chain lengths. Perfluorinated telomers can be prepared using building blocks of, e.g., $C_2$:$F_4$, (i.e., of fluorinated ethylene). Examples of telomeric processes for producing perfluorocarbon compounds include processes for linking together tetrafluoroethylene into controlled carbon size oligomers, including those processes practiced by Dupont, Clariant, Asahi Glass, and Daikin. Examples of perfluorinated alcohols include ZONYL (Dupont) and FLUOWET (Clariant).

Perfluorinated compounds can also be produced by direct fluorination of existing carbon chains, e.g., by fluorination with HF or $F_2$. Examples of such processes are described in U.S. Pat. Nos. 5,506,309; 5,523,496; 5,539,059; 5,543,567; 5,557,012; 5,571,870; 5,674,949; and 5,753,776.

Neither the telomerization literature nor the direct fluorination literature discloses compositions containing oil and/or water repellent agents containing a perfluorinated carbon moiety, an unfluorinated carbon linkage, and a reactive group, such as a (meth)acryloyloxy group, that can be polymerized or copolymerized into an effective oil or water repellent, that is free of PFOS, that can be polymerized in a non-VOC, noncombustible, non-ozone depleting solvent, and that can be formulated into a repellent composition without separation from this solvent, and applied directly onto the treatment substrate.

Because of the very real prospect that the production of PFOS and its analogs will continue to be viewed with strict regulatory scrutiny, there exists a need in the art for compositions and methods of producing compositions that are suitable for use in oil and/or water repellency applications, but that do not involve the production of PFOS or its analogs in appreciable quantities.

SUMMARY OF THE INVENTION

In one embodiment, the invention relates to compositions for increasing oil repellency, water repellency, or both, of fabric or fibers, containing:

(a) an effective amount of a repellent polymer selected from the group consisting of homopolymers and copolymers of one or more monomers having formula I:

$$R_f\text{—}(CH_2)_n\text{—}P \qquad (I)$$

wherein P is a polymerizable or copolymerizable moiety, $R_f$ is a straight chain or branched perfluoroalkyl group, P is a polymerizable or copolymerizable moiety, and n is an integer from 1 to 3; and (b) a fluorinated carbon solvent.

In another embodiment, the invention relates to methods for preparing an oil repellent, water repellent, or oil and water repellent composition, which methods include:

polymerizing or copolymerizing a fluorinated monomer having formula (I):

$$R_f\text{—}(CH_2)_n\text{—}P \qquad (I)$$

wherein $R_f$ is a straight chain or branched perfluoroalkyl group, P is a polymerizable or copolymerizable moiety, and n is an integer from 1 to 3, in the presence of a polymerization solvent comprising one or more fluorocarbons, hydrofluorocarbons, hydrochlorofluorocarbons, or combinations thereof, to produce the repellent composition comprising the polymer or copolymer and solvent.

In either embodiment, the fluorinated monomer can desirably contain a polymerizable moiety P that has formula (II):

$$\text{—OC(O)—X—}R_1 \qquad (II)$$

wherein X is a direct bond or —$NR_2$—, $R_1$ is a straight chain or branched alkyl, alkenyl, or aryl group, and $R_2$ is hydrogen or lower alkyl, wherein when X is a direct bond, $R_1$ has at least one unsaturated bond.

Moreover, in either embodiment, the fluorinated carbon solvent can be a fluorocarbon, a hydrofluorocarbon, or a hydrochlorfluorocarbon, or mixtures of any of these.

The compositions and methods of the invention are advantageous in that:

(1) they do not require separation of the polymerization solvent prior to application as a repellent composition;

(2) they use monomers that can be copolymerized with other monomers to form copolymer compositions having customized properties, such as hydrophobicity, oleophobicity, and the balance of these properties (e.g., by including monomers having hydrophobic moieties, oleophobic moieties, etc.);

(3) the resulting compositions are low in VOC, combustability, and have little deleterious effect on atmospheric ozone, and are therefore extremely environmentally friendly;

(4) irrespective of whether monomer (I) is produced by direct fluorination or telomerization, there is no detectable PFOS or other perfluoroalkylsulfonates (PFAS) in the composition, and the compositions present no bioaccumulation hazard with respect to this compound.

DETAILED DESCRIPTION OF SPECIFIC EMBODIMENTS OF THE INVENTION

The invention can be more clearly understood by reference to the following detailed description of some of its specific embodiments. This detailed description is provided for illustrative purposes, and should not be regarded as limiting of the description above, or of the appended claims.

The composition of this invention includes polymers formed from monomers having straight or branched chain perfluorinated carbon moieties that are linked to a polymerizable moiety through an alkylene chain. Desirably, the alkylene chain is a methylene chain, although other lower alkylene linkages, including branched linkages, may also be suitable. The polymerizable moiety is desirably linked to the alkylene linkage through an oxygen atom, which desirably forms a part of a carboxylic acid ester or urethane group. The remaining portion of the ester or urethane (i.e., the carboxylic or carbamic acid moiety) contains one or more functional groups that are homopolymerizable, or that are copolymerizable with suitable comonomers, or both.

Monomer (I) may be formed by a variety of methods. For example, a perfluorinated alcohol can be prepared either by a telomerization process, or by direct fluorination as described in one or more of U.S. Pat. Nos. 5,506,309; 5,523,496; 5,539,059; 5,543,567; 5,557,012; 5,571,870; 5,674,949, the contents of each of which are incorporated herein by reference. Telomerization generally resulted in a product where $R_f$ represents a distribution of different fluorocarbon lengths. In addition, monomers wherein n is greater than 1 are generally obtained through telomerization. Monomers wherein $R_f$ represents a single chain length, and where n is 1, were generally obtained by direct fluorination. The resulting perfluoroalcohol can then be reacted with the corresponding carboxylic acid, ester, anhydride or acid halide, or isocyanate, to form the corresponding ester or urethane. Suitable compounds for forming the ester or urethane include those that have polymerizable or copolymerizable moieties. Particularly suitable compounds are those having at least one reactive unsaturated bond, such as derivatives of acrylic acid, methacrylic acid, maleic acid, dimethylmeta-isopropenylbenzylisocyanate (Cytec), 2-isocyanoethyl methacrylate, and methallyl isothiocyanate, and the like. The esterification or urethane formation processes are standard and known in the art. Desirably, the resulting ester or urethane contains a P moiety corresponding to formula (II)

$$—OC(O)—X—R_1 \qquad (II)$$

wherein X is a direct bond or $—NR_2—$, $R_1$ is a straight chain or branched alkenyl group, which may be optionally substituted, or an aryl group substituted with an unsaturated carbon chain, $R_2$ is hydrogen or alkyl, wherein $R_1$ has at least one unsaturated bond.

Desirably, $R_f$ contains between 1 and 20 fluorinated carbons, more particularly between about 8 and 15 fluorinated carbons, even more particularly, about 10 fluorinated carbons. $R_f$ can represent a single perfluoro moiety, or can represent a distribution of different perfluoro moieties if, e.g., the monomer was produced using telomerization techniques.

As indicated above, the monomer of the invention can be homopolymerized, or can be mixed with a comonomer and be copolymerized. Suitable comonomers include vinylic monomers, such as acrylic acid, acrylic anhydride, alkyl acrylates, hydroxyalkylacrylates, methacrylic acid, methacrylic anhydride, alkylmethacrylates, hydroxyalkylmethacrylates, wherein the alkyl moieties have from 1 to about 20 carbon atoms, maleic anhydride, acryloyl chloride, and methacryloyl chloride, or other monomer compound capable of copolymerizing with monomer (I), such as those having reactive unsaturated bonds between carbon atoms.

Other suitable comonomers include those containing ethylene oxide moieties, such as compounds containing methyl capped poly ethylene glycols, as well as the corresponding ethyl capped, propyl capped, butyl capped, or similarly capped compounds having glycol groups.

In one embodiment of the invention, the comonomer excludes polyalkoxylated polyurethanes having pendant perfluoroalkyl groups of the type disclosed in U.S. Pat. No. 5,350,795, the entire contents of which are incorporated herein by reference.

When monomer (I) contains a reactive unsaturated moiety, and/or when any of the above comonomers are present, the polymerization reaction can be conducted in the presence of a polymerization initiating composition, desirably containing a free radical initiator. Suitable initiators include azo-containing free radical initiators, such as the VAZO initiators (Dupont) or peroxy-containing free radical initiators, which are soluble in water insoluble monomers, and are more specially soluble in isopropyl alcohol, or similar alcohols, HFC solvents, or HCFC solvents.

As indicated above, the polymerization reaction takes place in a fluorocarbon-containing polymerization solvent. Suitable solvents include hydrofluorocarbon solvents, hydrochlorfluorocarbon solvents, and mixtures of these with each other and with other solvents, such as haloethylents. Particularly suitable solvents include 2,3-dihydrodecafluoropentane (e.g., VERTREL XF, Dupont) and mixtures of 2,3-dihydrodecafluoropentane with a chloroethylene, such as trans-1,2-dichloroethylene (VERTREL CCA, Dupont). The former solvent system (e.g., VERTREL XF) is particularly suitable for use in preparing homopolymers of monomer (I), while the latter solvent system (e.g., VERTREL CCA) is particularly suitable for use in preparing copolymers of monomer (I) with long chain hydrocarbyl comonomers.

A typical example of one such polymer is obtained by polymerizing 51.35 g 1H, 1H-perfluoro-n-decyl methacrylate, 41.56 g polyethyleneglycol(n) methacrylate (N=5), 7.09 g triethyleneglycol monomethylether methacrylate in VERTREL XF. Another typical example is a polymer prepared by homopolymerizing monomer (I) wherein n is 2, $R_f$ represents a distribution of perfluorocarbon lengths, ranging between about 2 and about 20, X is a direct bond, and $R_1$ is —CH=$CH_2$ or —C($CH_3$)=$CH_2$. Another typical example is a copolymer prepared by copolymerizing stearyl (meth) acrylate with monomer (I) wherein n is 1, $R_f$ is perfluorononyl, X is a direct bond, and $R_1$ is —CH=$CH_2$ or —C($CH_3$)=$CH_2$.

PREPARATION EXAMPLES

In the following examples, fluorinated $C_{10}$ alcohols were made by direct fluorination and esterified with acylic acid or methacrylic acid to form a monomer of formula (I), wherein P corresponds to formula (II), wherein n is 1, X is a direct bond, and $R_1$ is —CH=$CH_2$ or —C($CH_3$)=$CH_2$. The monomer was homopolymerized in the solvent indicated under the conditions indicated. In each case, monomer(s) were mixed with solvent and initiator, and the temperature was raised to the boiling point of the solvent mixture and refluxed. The particular initiator was selected based on solvent boiling point in order to control radical generation rate. For example, initiators were used having 10 hour half-life temperatures that approximated the solvent boiling point. Polymerizations conducted in VERTREL XF used VAZO 52 (Dupont) initiator; polymerizations conducted in VERTREL CCA used WAKO V70 (Wako) initiator, and polymerization in OMS used VAZO 67 (Dupont) or lauryl peroxide.

TESTING EXAMPLES

The compositions were tested for oil and water repellency using a Dupont ZEPEL/TEFLON oil and water repellency test kit. The same tests were conducted on homopolymers prepared from methacrylic acid esters of FLUOWET MA 812 (Clariant) and acrylic acid esters of FLUOWET AC 812 (Clariant), which are perfluorinated alcohols prepared by telomerization. The results are presented below. Table 1 provides preparation information for the examples and comparative examples, while Table 2 provides repellency test results. All repellency testing was conducted at an adjusted 0.2 wt % fluorine concentration by dilution with VERTREL XF. The resulting solutions were applied at 100% wet pick up to standard filter paper, air dried, and tested using the various oils and water solutions in the test kit (for example using the various oils specified in AATCC test method 118-1989). A drop from a pipette was deposited on the filter paper. If no visible wetting occurred after the specified time period, then the paper was considered a pass. If visible wetting occurred before the time period of the test expired, the paper was considered a pass, even if the droplet still beaded.

TABLE 1

| EXP. NO. | DESCRIPTION | POLYMER CONC. (WT %) | SOLIDS CONTENT (WT %) | FLUORINE CONTENT (WT %) | INITIATOR AMOUNT (WT %) | COMMENTS |
| --- | --- | --- | --- | --- | --- | --- |
| 1 | C10 perfluoroacrylate homopolymer | 30 | 25.8 | N/a | 0.215 | Polymerized in VERTREL CCA; precipitated at room temperature. |
| 2, 2a | C10 perfluoroacrylate homopolymer | 30, 30 | 36.3, 33.7 | N/a | .119, 1 | Polymerized in VERTREL XF; both precipitated at room temperature. |
| 3, 3a | C10 perfluoroacrylate homopolymer | 30, 30 | 22.3, 36.5 | N/a | .145, 1 | Polymerized in VERTREL XF. |
| 4, 4a | C10 perfluoroacrylate homopolymer | 30 | 18.0, 36.2 | N/a, 18.14 | 0.116, 1 | Polymerized in VERTREL XF; formed white precipitate. |
| 5 | MA 812 methacrylate homopolymer | 30 | N/a | N/a | 0.18 | Polymerized in OMS1; formed precipitate. |
| 6 | MA 812 methacrylate homopolymer | 30 | 32.20 | 19.54 | 0.142 | Polymerized in VERTREL CCA; formed hazy liquid. |
| 7 | MA 812 methacrylate homopolymer | 30 | 33.90 | 14.52 | 0.114 | Polymerized in VERTREL XF; formed clear orange liquid. |
| 8 | AC 812 acrylate homopolymer | 30 | N/a | N/a | 0.19 | Polymerized in OMS, precipitated. |
| 9 | AC 812 acrylate homopolymer | 30 | 30.50 | 16.22 | 0.145 | Polymerized in VERTREL CCA; hazy liquid with some precipitate |
| 10 | AC 812 acrylate homopolymer | 30 | 26.60 | 15.75 | 0.12 | Polymerized in VERTREL XF; clear liquid. |

1 OMS is odorless mineral spirits

TABLE 2

| EXP NO. | DESCRIPTION | WATER REPELLENCY, 1 MIN. | | | WATER REPELLENCY, 30 MIN. | | | OIL REPELLENCY, 1 MIN. | | | OIL REPELLENCY, 30 MIN. | | |
|---|---|---|---|---|---|---|---|---|---|---|---|---|---|
| | | 3W | 4W | 5W | 3W | 4W | 5W | 3O | 4O | 5O | 3O | 4O | 5O |
| 4a | C10 perfluoro-acrylate homopolymer | F | F | F | F | F | F | P | P | P | P | P | P |
| 6 | MA 812 methacrylate homopolymer | F | F | F | F | F | F | P | P | P | P | P | P |
| 7 | MA 812 methacrylate homopolymer | P | P | P | F | F | F | P | P | P | P | P | P |
| 9 | AC 812 acrylate homopolymer | P | P | P | P | P | P | P | P | P | P | P | P |
| 10 | AC 812 acrylate homopolymer | P | P | P | P | P | P | P | P | P | P | P | P |

In addition, in the following experiments, FLUOWET MA 812 was esterified with methacrylic acid and copolymerized with stearyl methacrylate (Experiment 11), a perfluorinated C7 alcohol (prepared by direct fluorination) esterified with methacrylic acid was homopolymerized (Experiment 12), the ester used in Experiment 12 was copolymerized with stearyl methacrylate (Experiment 13), a perfluorinated C10 alcohol (prepared by direct fluorination) esterified with acrylic acid was copolymerized with stearyl methacrylate (Experiment 14), and the perfluorinated C10 alcohol used in Experiment 14 was esterified with methacrylic acid and copolymerized with stearyl methacrylate (Experiment 15). The preparation information is provided below in Table 3. Repellency results are provided below in Table 4.

TABLE 3

| EXP. NO. | DESCRIPTION | POLYMER CONCENTRATION (WT %) | FLUORINE CONCENTRATION (WT %) | COMMENTS |
|---|---|---|---|---|
| 11 | MA 812/stearyl methacrylate copolymer | 32 | 5.42 | Polymerized in VERTREL CCA at 37° C.; precipitate noted. |
| 12 | Perfluorinated C7 methacrylate ester homopolymer | 30 | 8.67 | Polymerized in VERTREL XF |
| 13 | Perfluorinated C7 methacrylate ester/stearyl methacrylate copolymer | 40 | 12.49 | Polymerized in OMS. |
| 14 | Perfluorinated C10 acrylate ester/stearyl methacrylate copolymer | 30.60 | 7.67 | Polymerized in OMS; highly viscous liquid obtained. |
| 15 | Perfluorinated C10 methacrylate ester/stearyl methacrylate copolymer | 30.60 | 9.2 | Polymerized in OMS; moderate viscosity liquid obtained. |

TABLE 4

| EXP. NO. | WATER REPELLENCY, 1 MIN. | | | WATER REPELLENCY, 30 MIN. | | | OIL REPELLENCY, 1 MIN. | | | OIL REPELLENCY, 30 MIN. | | |
|---|---|---|---|---|---|---|---|---|---|---|---|---|
| | 3W | 4W | 5W | 3W | 4W | 5W | 3O | 4O | 5O | 3O | 4O | 5O |
| 11 | P | F | F | F | F | F | P | P | P | P | P | P |
| 12 | F | F | F | F | F | F | P | P | F | P | P | F |
| 13 | P | F | F | F | F | F | P | P | F | F | F | F |
| 14 | P | P | P | P | P | P | P | P | P | P | P | P |
| 15 | F | F | F | F | F | F | P | P | P | P | P | P |

The polymer compositions according to this invention can be used to increase oil repellency, water repellency, or both, by application to a wide range of substrates, including without limitation synthetic fibers, natural or organic fibers, cellulosic wood, cellulosic paper, organic resins, synthetic resins, melt extruded plastic (polypropylene, polyethylene, polyesters, polystyrene, polycarbonates), coatings, paints, films, or laminates.

The compositions of the invention are particularly suitable for use as stain and/or soil protection treatments for fibers or fabrics made from polyamide (nylon, silk, wool), leather, cotton, polypropylene, PET, PBT, PTT, polyester, acrylic, or animal fibers.

The composition can be applied to these various substrates by a variety of methods, including, but not limited to, dip-pad squeezing, spraying, foaming, etc. Suitable fixation methods include, but are not limited to, hot thermal drying, steam exhaust, or ambient drying. The solution is applied to the substrate at a desired application rate and amount (typically ranging between about 500 and about 4000 ppm F) so that the resulting treated substrate will have oil repellency, water repellency, or both, and the treatment process does not involve exposure to VOC's or bioaccumulative chemical species.

What is claimed is:

1. A composition for increasing oil repellency, water repellency, or both, of fabric or fibers, comprising:
   an effective amount of a copolymer comprising one or more monomers having formula I:

$$R_f-(CH_2)_n-P \quad (I)$$

wherein $R_f$ is a straight chain or branched perfluoroalkyl group, P is a polymerizable moiety and n is an integer from 1 to 3; and
   one or more monomers selected from the group consisting of dimethylmetaisopropenylbenzylisocyanate, 2-isocyanoethyl methacrylate, and methallyl isothiocyanate.

2. The composition of claim 1, wherein P has the formula $$-OC(O)-X-R_1 \quad (II)$$

wherein X is a direct bond or —NH—, $R_1$ is a straight chain or branched alkenyl, or aryl group substituted with an unsaturated carbon chain.

3. The composition of claim 1, wherein n is 1.

4. The composition of claim 2, wherein $R_1$ is an alkenyl moiety having between 2 and 10 carbon atoms.

5. The composition of claim 1, wherein $R_f$ contains between 2 and 15 carbon atoms.

6. The composition of claim 1, wherein $R_f$ has 9 carbon atoms.

7. The composition of claim 2, wherein $R_1-X-C(O)O-$ is selected from the group consisting of acrylic acid, methacrylic acid, and maleic acid.

8. The composition of claim 1, further comprising a fluorinated carbon solvent.

9. The composition of claim 8, wherein the fluorinated carbon solvent comprises 2,3-dihydrodecafluoropentane.

10. The composition of claim 8, wherein the fluorinated carbon solvent further comprises chloroethylene.

11. The composition of claim 10, wherein the chloroethylene comprises trans-1,2-dichloroethylene.

12. A method preparing an oil repellent, water repellent, or oil and water repellent composition, comprising:
    copolymerizing a fluorinated monomer having formula (I):

$$R_f-(CH_2)_n-P \quad (I)$$

wherein $R_f$ is a straight chain or branched perfluoroalkyl group, P is a polymerizable moiety and n is an integer from 1 to 3; and
    one or more monomers selected from the group consisting of dimethylmetaisopropenylbenzylisocyanate, 2-isocyanoethyl methacrylate, and methallyl isothiocyanate.

13. The method of claim 12, wherein P has the formula $$-OC(O)-X-R_1 \quad (II)$$

wherein X is a direct bond or —NH—, $R_1$ is a straight chain or branched alkenyl, or aryl group substituted with an unsaturated carbon chain.

14. The method of claim 12, wherein the copolymerization is conducted in a fluorocarbon polymerization solvent.

15. The method of claim 14, wherein the fluorocarbon polymerization solvent comprises fluorocarbons, hydrofluorocarbons, hydrochlorofluorocarbons, or mixtures thereof.

16. The method of claim 14, wherein polymerization solvent comprises 2,3-dihydrodecafluoropentane.

17. The composition of claim 14, wherein the polymerization solvent further comprises chloroethylene.

18. The composition of claim 17, wherein the chloroethylene comprises trans-1,2-dichloroethylene.

* * * * *